United States Patent [19]
Brown

[11] Patent Number: 5,399,838
[45] Date of Patent: Mar. 21, 1995

[54] AUTOMOTIVE HEATING APPARATUS

[76] Inventor: Neville L. Brown, 1102 W. 4th St., Rector, Ark. 72461

[21] Appl. No.: 48,319

[22] Filed: Apr. 19, 1993

[51] Int. Cl.$^6$ ............................................. H05B 3/06
[52] U.S. Cl. .................................... 219/202; 219/532
[58] Field of Search ........................ 219/202, 203, 532; 392/360–369, 403; 338/318, 278, 282, 297, 304, 305

[56] References Cited

U.S. PATENT DOCUMENTS

| | | | |
|---|---|---|---|
| 973,089 | 10/1910 | Walter | 219/532 |
| 1,102,249 | 7/1914 | Denhard | 338/305 |
| 1,366,519 | 1/1921 | Carmean | 338/318 |
| 1,402,335 | 1/1922 | Anderson | 338/297 |
| 4,220,846 | 9/1980 | Rice | 338/297 |
| 4,636,615 | 1/1987 | Petz | 219/532 |
| 4,667,086 | 5/1987 | Keefe | 219/532 |

Primary Examiner—Teresa J. Walberg
Attorney, Agent, or Firm—E. Michael Combs

[57] ABSTRACT

A heating disc is arranged for positioning within an air duct portion of a vehicular heating conduit, wherein a cylindrical side wall mounts an electrical resistance heating coil therewithin arranged for operative communication with the electrical system in an associated vehicle. The apparatus is arranged to optionally employ a mesh grid structure in a replaceable manner, wherein the mesh grid includes a surrounding fragrance dispensing tube structure about the leg portions of the grid structure.

4 Claims, 4 Drawing Sheets

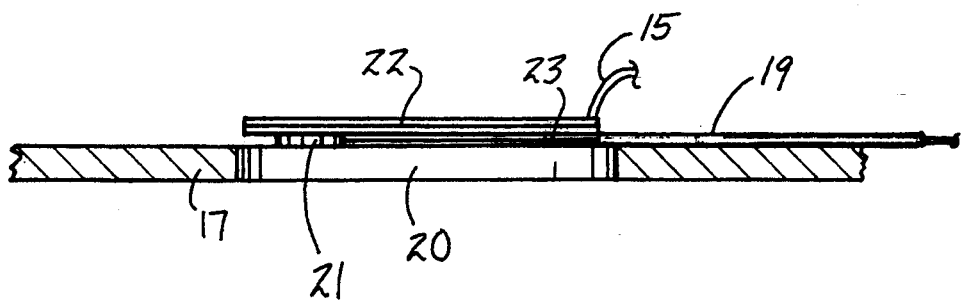
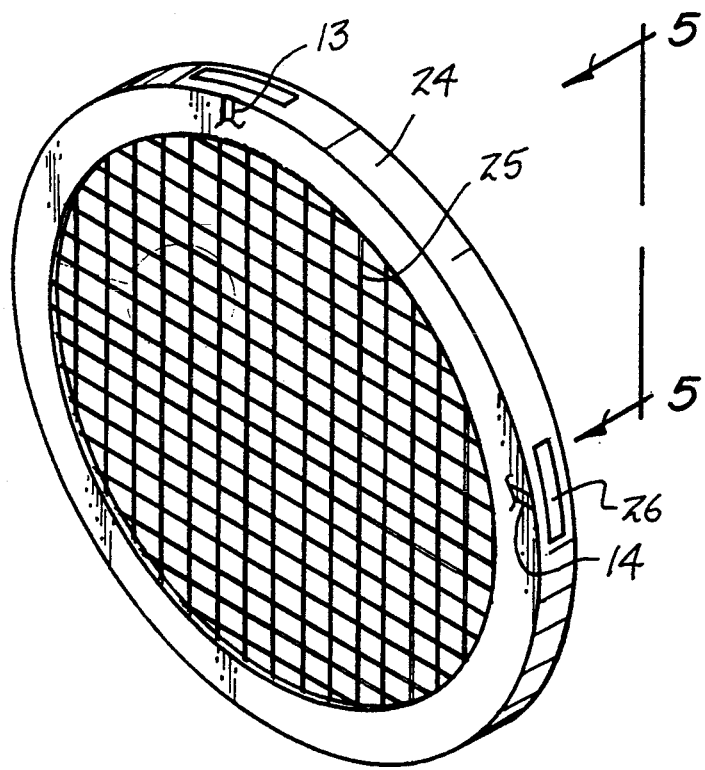

AUTOMOTIVE HEATING APPARATUS

BACKGROUND OF THE INVENTION

1. Field of the Invention

The field of invention relates to automotive heating, and more particularly pertains to a new and improved automotive heating apparatus arranged to permit instantaneous heating for a passenger compartment of an associated vehicle.

2. Description of the Prior Art

Typical water cooled engines direct a portion of the coolant into a heating radiator to direct heat therefrom by use of forced air circulation, in a manner known-in the prior art. The instant invention is arranged to overcome deficiencies of the prior art by further employing an instantaneous heating component utilizing an electrical heating member therewithin to provide for instantaneous heating prior to the coolant within the radiator reaching elevated temperatures sufficient for heating of the passenger compartment. Prior art heating structure is indicated in the U.S. Pat. Nos. 4,968,869; 4,916,287; 5,068,589; and 4,293,759.

SUMMARY OF THE INVENTION

In view of the foregoing disadvantages inherent in the known types of vehicular passenger compartment heating structure now present in the prior art, the present invention provides an automotive heating apparatus wherein the same is arranged to provide for instantaneous heating and warming of a passenger compartment of an associated automotive vehicle. As such, the general purpose of the present invention, which will be described subsequently in greater detail, is to provide a new and improved automotive heating apparatus which has all the advantages of the prior art automotive heating apparatus and none of the disadvantages.

To attain this, the present invention provides a heating disc arranged for positioning within an air duct portion of a vehicular heating conduit, wherein a cylindrical side wall mounts an electrical resistance heating coil therewithin arranged for operative communication with the electrical system in an associated vehicle. The apparatus is arranged to optionally employ a mesh grid structure in a replaceable manner, wherein the mesh grid includes a surrounding fragrance dispensing tube structure about the leg portions of the grid structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive heating apparatus which has all the advantages of the prior art automotive heating apparatus and none of the disadvantages.

It is another object of the present invention to provide a new and improved automotive heating apparatus which may be easily and efficiently manufactured and marketed.

It is a further object of the present invention to provide a new and improved automotive heating apparatus which is of a durable and reliable construction.

An even further object of the present invention is to provide a new and improved automotive heating apparatus which is susceptible of a low cost of manufacture with regard to both materials and labor, and which accordingly is then susceptible of low prices of sale to the consuming public, thereby making such automotive heating apparatus economically available to the buying public.

Still yet another object of the present invention is to provide a new and improved automotive heating apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged orthographic view, taken along the lines 3—3 of FIG. 1 in the direction indicated by the arrows.

FIG. 4 is an isometric illustration of the invention employing a screen mesh structure mounted within the continuous frame.

DESCRIPTION OF THE PREFERRED EMBODIMENT

Figure 1:
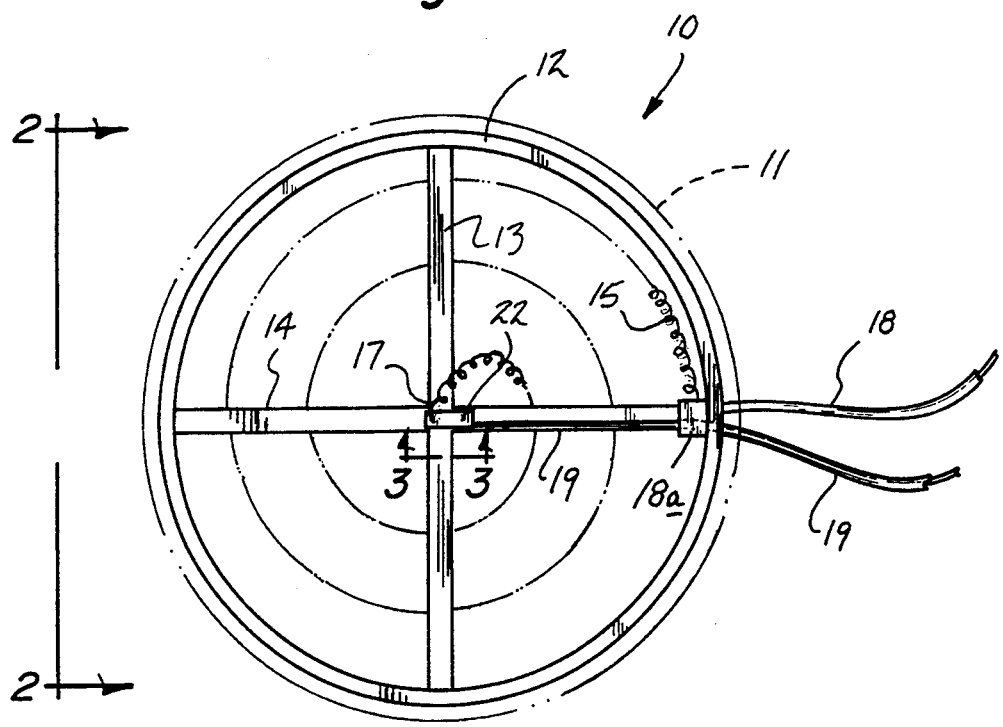
FIG. 1 is an orthographic view of the invention.
Figure 2:
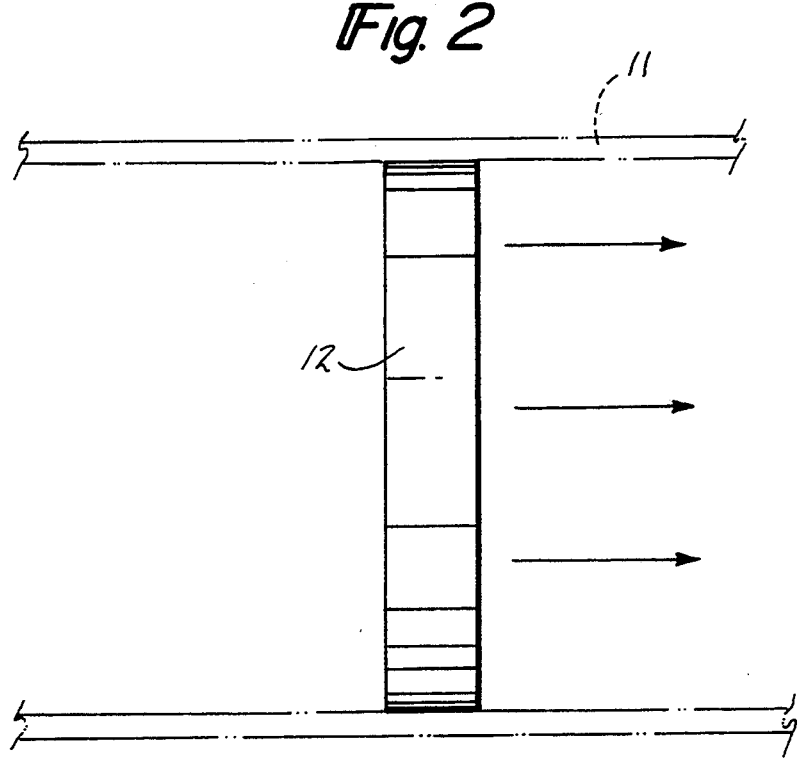
FIG. 2 is an orthographic view, taken along the lines 2—2 of FIG. 1 in the direction indicated by the arrows.
Figure 5:
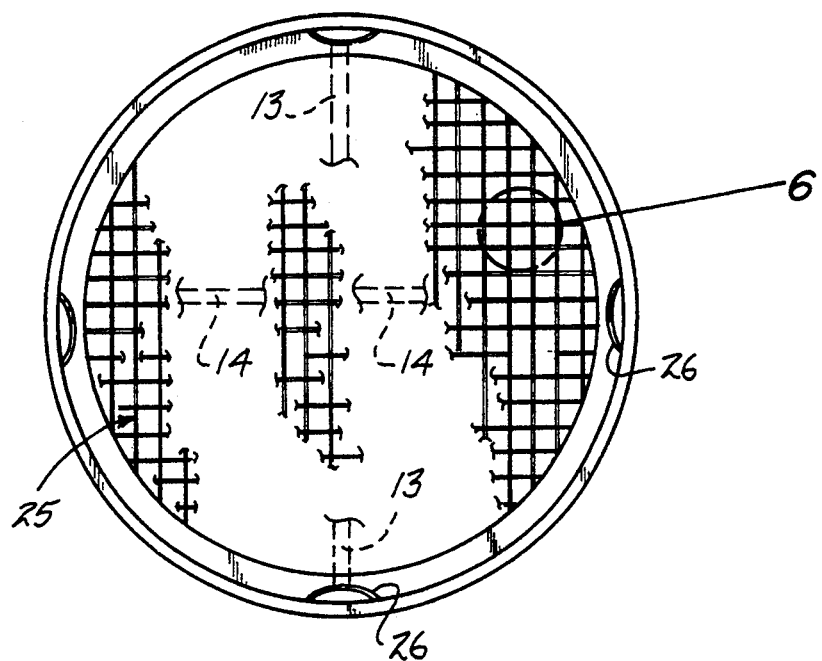
FIG. 5 is an orthographic view, taken along the lines 5—5 of FIG. 4 in the direction indicated by the arrows, indicating the mesh structure with the heating element structure removed therefrom for ease of viewing of the mesh screen.
Figure 6:
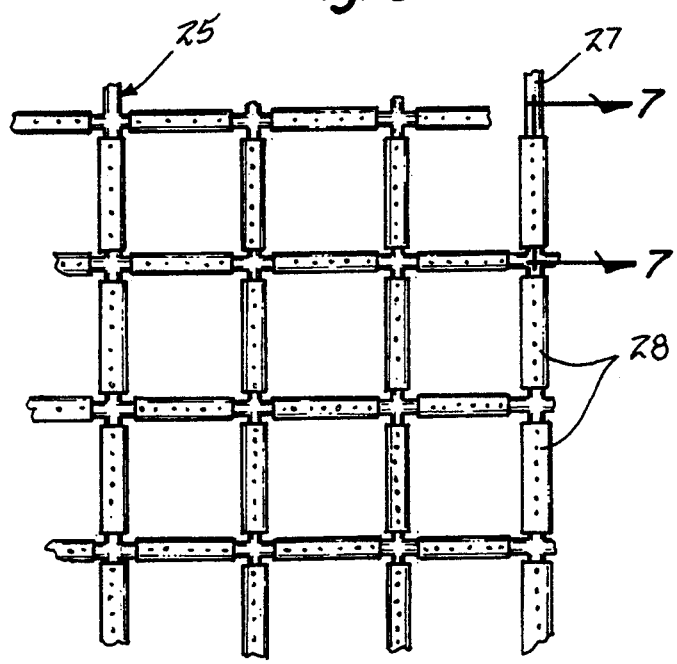
FIG. 6 is an enlarged orthographic view of section 6 as set forth in claim 5.
Figure 7:
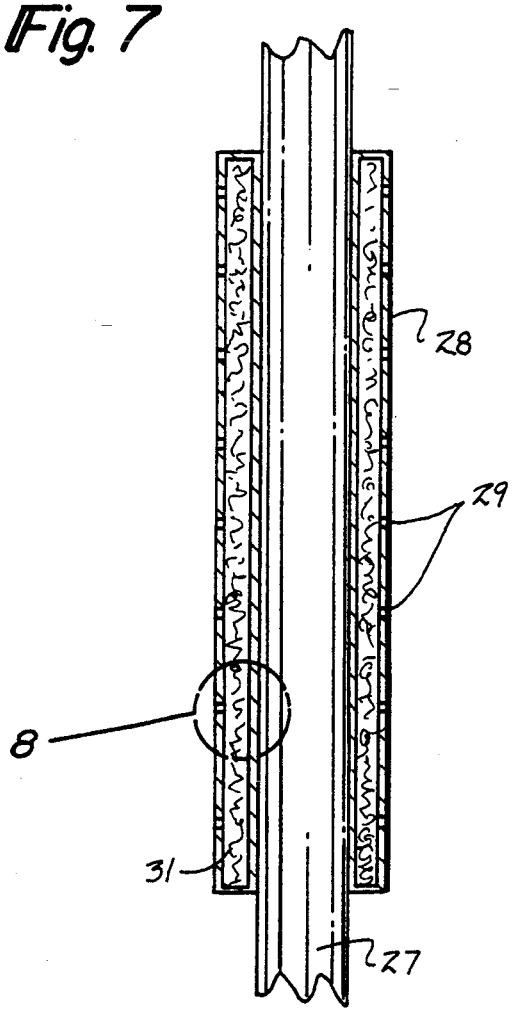
FIG. 7 is an orthographic view, taken along the lines 7—7 of FIG. 6 in the direction indicated by the arrows.
Figure 8:
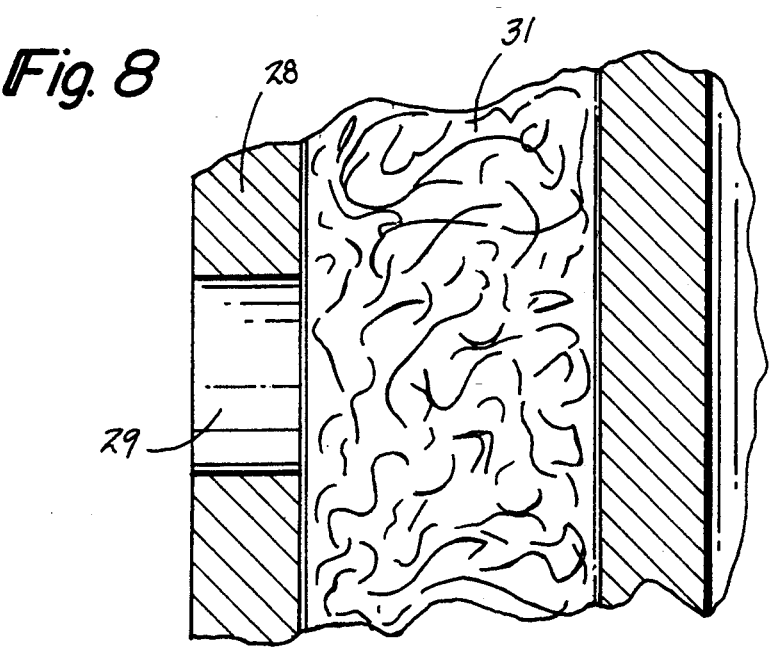
FIG. 8 is an enlarged orthographic view of section as set forth in FIG. 7.

With reference now to the drawings, and in particular to FIGS. 1 to 8 thereof, a new and improved automotive heating apparatus embodying the principles and concepts of the present invention and generally designated by the reference numeral 10 will be described.

More specifically, the automotive heating apparatus 10 of the instant invention essentially comprises the use of a rigid continuous frame 12 mounted within a heating duct 11, with the frame having respective first and second rigid support legs 13 and 14 orthogonally intersecting one another at a junction plate 17. The junction plate is oriented medially of the frame 12, with electrical resistance heating coil 15, typically of a helical configuration, extending from the frame 12 to the junction plate 17. A first electrical cable 18 is directed to a first cable junction 18a, wherein the heating coil 15 originates. The heating coil extends from the first cable junction 18a to a bimetallic strip 22. A junction plate aperture 20 (see FIG. 3) extends medially through the junction plate, wherein the junction plate aperture 20 is arranged to receive air as it is heated directed through the heating duct 11. Such heated air impinges upon the bimetallic strip 22, whereupon the bimetallic strip 22 includes a bimetallic strip support block 23 on a first side of the junction plate aperture 20. The bimetallic strip extends over the junction plate aperture 20 for engagement with a second cable contact plate 21 that is in electrical communication with the second cable 19. Upon air being heated and directed through the junction plate aperture 20 from the vehicle conventional heating source such as the heater core or heater radiator within the vehicle, the bimetallic strip 22 separates from the second cable contact plate 21 to effect discontinuance of electrical energy available to the heating coil 15 and thereby discontinues the heating coil automatically upon heated air within the duct 11 reaching a predetermined temperature to effect such deflection of the bimetallic strip 22. It should be understood that the bimetallic strip 22 is constructed to provide such separation from the contact plate 21 only upon the addition of heated air directed through the junction plate aperture 20 in addition to the heat availed from the heating coil 15, wherein such cumulative heat alone effects the displacement of the bimetallic strip 22.

The frame 12 having an exterior side wall surface 24 includes a plurality of removable support clips 26 directed through the side wall surface 24 to secure a screen mesh 25 continuously within the frame 12. The support clips 26 removably mounted through the frame 12 at the wall surface 24 (FIG. 4) permitting removal of the support clips 26 relative to the frame 12 for separation and removal of the screen mesh 25 relative to the frame 12. The mesh 25 includes a matrix of mesh rods 27, wherein the mesh rods 27, or at least a plurality of such mesh rods, have metallic cover tubes 28, each including an enclosed cavity 30 between the cover tubes 28 and an associated mesh rod 27 (see FIG. 8), wherein the enclosed cavity 30 includes a powdered fragrance 31 such that heating of the fragrance 31 directs such fragrance through cover tube apertures 29 directed to an exterior surface of the cover tube in communication with the enclosed cavity 30 to thereby direct such fragrance into a passenger compartment of a vehicle. In this manner, the frame 12 may be periodically removed to replenish the screen mesh 25 upon removal of the support clips 26 through the side wall surface 24.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily, occur to those skilled in the art, it is not desired to limit the invention to the exact construction and operation shown and described, and accordingly, all suitable modifications and equivalents may be resorted to, failing within the scope of the invention.

What is claimed as being new and desired to be protected by Letters Patent of the United States is as follows:

1. An automotive heating apparatus arranged in combination with a heating duct, with the apparatus comprising a rigid continuous frame mounted within said heating duct, the frame including a first rigid support leg fixedly intersecting a second rigid support leg at a junction plate, with the junction plate oriented medially of the frame, and within the frame, and a first electrical cable having a first electrical cable junction mounted within the frame in adjacency to the frame, and a second electrical cable extending to the junction plate, with the junction plate having a second cable contact plate, and the second electrical cable extending to and in electrical communication with the second cable contact plate, and an electrical resistance heating coil wound within the frame in electrical communication with the first electrical cable at a first electrical cable junction, and the electrical resistance heating coil in electrical communication with the second electrical cable at the second cable contact plate.

2. An apparatus as set forth in claim 1 wherein the junction plate includes a bimetallic strip, the bimetallic strip including a bimetallic strip support block, and the bimetallic strip support block securing said bimetallic strip at a first end of the bimetallic strip, and the second end of the bimetallic strip arranged for abutment with the second cable contact plate, and a junction plate aperture oriented between the second cable contact plate and the bimetallic strip support block, with the junction plate aperture extending through the junction plate, and the second cable in electrical communication with the bimetallic strip, whereupon heating of said bimetallic strip by heated air directed through said duct and said junction plate aperture effects separation of the bimetallic strip from the second cable contact plate.

3. An apparatus as set forth in claim 2 including a screen mesh mounted continuously within the frame in adjacency to the heating coil, and the screen mesh including a plurality of removable support clips removably mounted through the frame permitting removal of the support clips relative to the frame for separation and removal of the screen mesh relative to the frame.

4. An apparatus as set forth in claim 3 wherein the screen mesh includes a plurality of intersecting mesh rods, wherein at least one of said mesh rods includes a metallic cover tube, wherein said cover tube includes an enclosed cavity, with the cover tube having tube apertures directed through the cover tube in communication with the enclosed cavity, the enclosed cavity having a powdered fragrance therewithin, whereupon heating of the mesh frame effects heating of said powdered fragrance and directing of a fragrance directed from said powdered fragrance through the apertures.

* * * * *